(No Model.) 7 Sheets—Sheet 4.

F. H. RICHARDS.
STRAIGHT PULL BOLT GUN.

No. 506,339. Patented Oct. 10, 1893.

Witnesses:
Henry L. Reckard.
H. Mallner.

Inventor:
F. H. Richards (No Model.) 7 Sheets—Sheet 5.

F. H. RICHARDS.
STRAIGHT PULL BOLT GUN.

No. 506,339. Patented Oct. 10, 1893.

Witnesses:
Henry L. Rickard.
H. Mallner.

Inventor:
F. H. Richards (No Model.) 7 Sheets—Sheet 6.

F. H. RICHARDS.
STRAIGHT PULL BOLT GUN.

No. 506,339. Patented Oct. 10, 1893.

Witnesses:
Henry L. Reckard.
H. Mallner.

Inventor:
F. H. Richards

(No Model.)

F. H. RICHARDS.
STRAIGHT PULL BOLT GUN.

Patented Oct. 10, 1893.

Witnesses:
Henry L. Rickard.
H. Mallner.

Inventor:
F. H. Richards

UNITED STATES PATENT OFFICE.

FRANCIS H. RICHARDS, OF HARTFORD, CONNECTICUT, ASSIGNOR TO JAMES PARIS LEE, OF SAME PLACE.

STRAIGHT-PULL BOLT-GUN.

SPECIFICATION forming part of Letters Patent No. 506,339, dated October 10, 1893.

Application filed September 26, 1892. Serial No. 446,890. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Bolt-Guns, of which the following is a specification.

This invention relates to improvements in that class of breech-loading fire-arms commonly known as bolt-guns.

The object of my present invention is to provide an improved bolt-mechanism of the "straight-movement" variety, and improved means for locking, actuating and unlocking the bolt of the fire-arm.

In the drawings accompanying and forming a part of this specification, my present invention is shown applied to a breech-loading magazine fire-arm of the particular type, or class, hereinbefore specified.

Similar characters designate like parts in all the figures.

Figure 5:
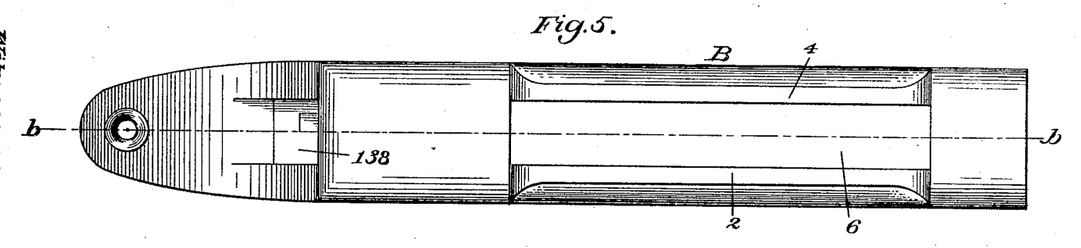
Fig. 5 is a plan view of the receiver, or gun-frame.
Figures 6, 7:
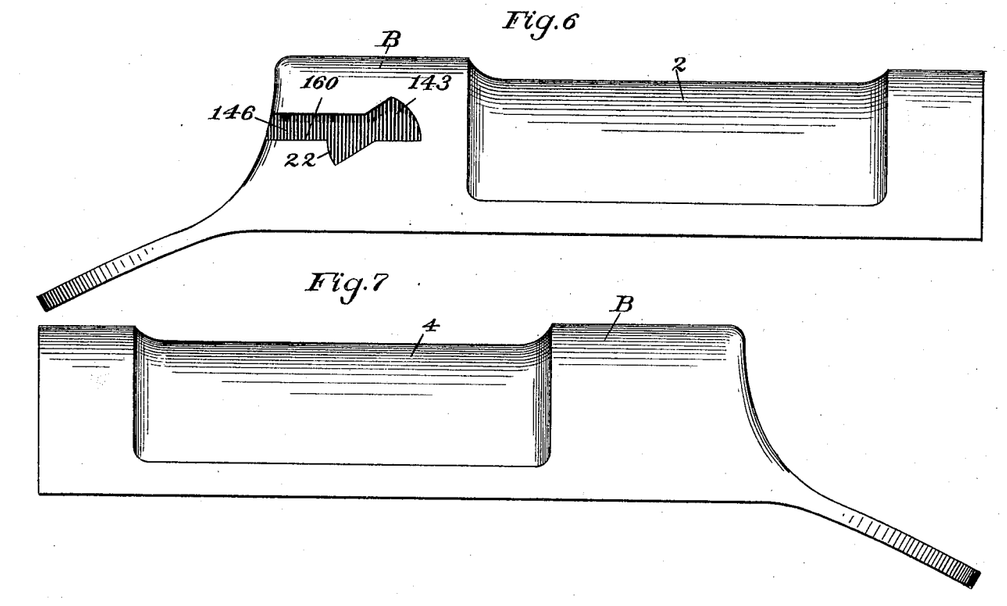
Fig. 6 is a right-hand side elevation of the receiver.
Fig. 7 is a left-hand side elevation of the receiver.
Figure 8:
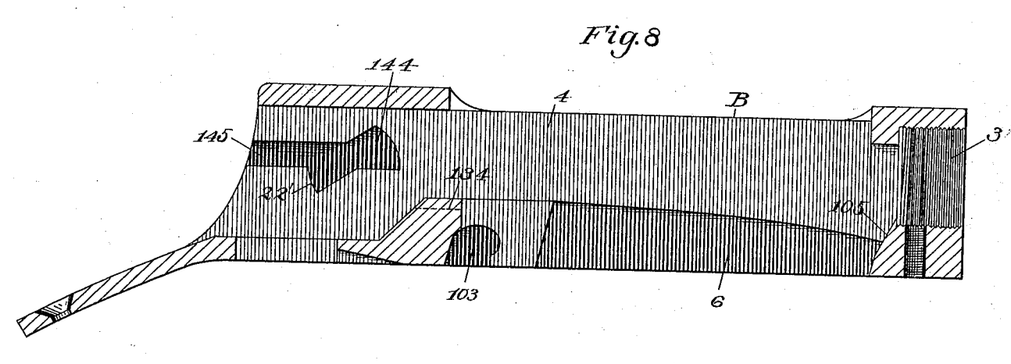
Fig. 8 is a sectional view of the receiver, in line *b b*, Fig. 5, showing the portion above said line.
Figure 9:
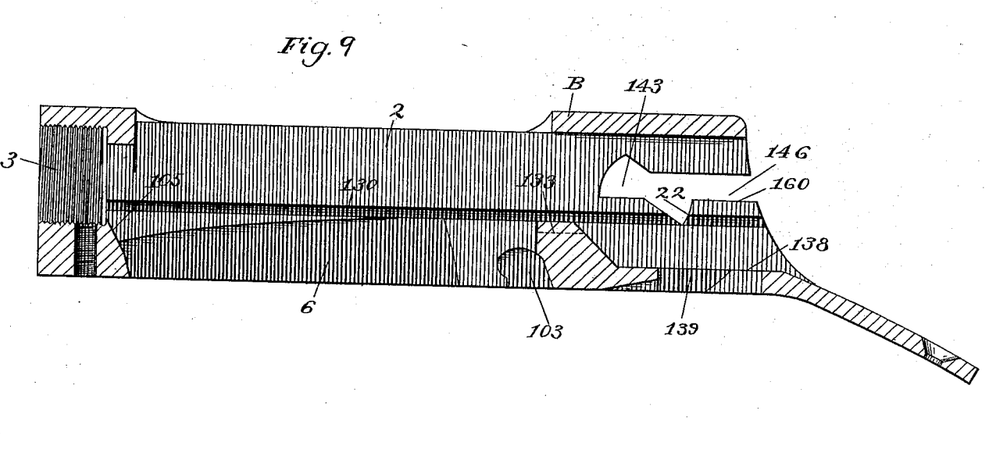
Fig. 9 is a vertical section of the receiver, showing the portion below said line *b b* in Fig. 7; these two figures being for the purpose of illustrating the internal construction of the receiver and showing the several features thereof which co-act with the bolt-mechanism.
Figure 10:
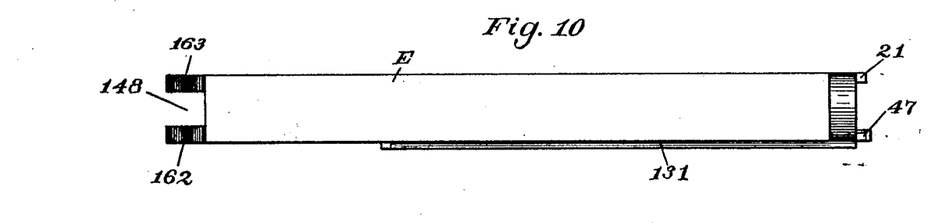
Fig. 10 is a plan view of the bolt.

The receiver, designated in a general way by B, is adapted to carry a sliding bolt, and has recoil-abutments for sustaining the bolt when this is closed, (and through its actuator or locker,) against retraction. In its preferred form herein shown, the receiver, or gun-frame, consists of an open frame having the two side-walls 2 and 4, joined at their front and rearward ends and constructed to carry the barrel C and for attachment to the stock, D, of the gun; and to receive within it the bolt-mechanism. At its front end, the receiver has the bore 3, Figs. 3, 8 and 9, for receiving the threaded end, 5, of the barrel C. A mortise, 6, Figs. 5, 8 and 9, is formed for receiving the upper end of the magazine M, (Fig. 3,) and through which to load the magazine, and also to load the gun when using this as a single-loader; the gun may be used as a single-loader at any time when the magazine is emptied of cartridges.

Figure 4:
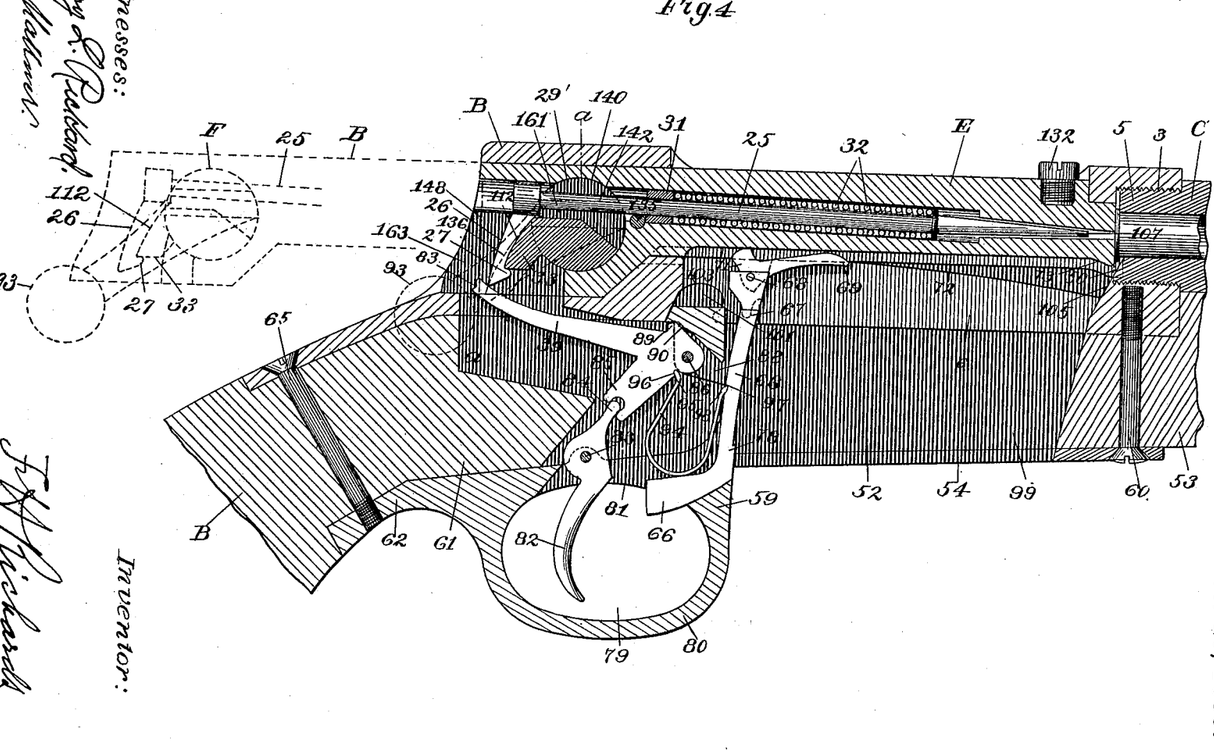
Fig. 4 is a sectional view similar to Fig. 3, showing the bolt-actuator retracted ready for the withdrawal of the bolt, and also showing, by dotted lines, the bolt-mechanism drawn back to its rearward position.

On the inner side of the right-hand wall, 2 of the receiver B is formed a groove, 130, in which runs the rib, 131, of the bolt, and which serves as a guide to prevent vertical movement of the bolt when this is drawn back to its open position shown by dotted lines in Fig. 4. Two grooves, 133 and 134, respectively, are formed in the receiver as indicated by dotted lines in Figs. 8 and 9, to permit of the free passage of the projections, 20 and 21, of the bolt when this is removed from the gun; these projections being for the purpose of driving forward the cartridges.

The bolt E is bored longitudinally thereof to receive the firing-pin 25, and at the rearward end thereof is downwardly slotted, at 148, for the depending arm 26 of said firing-pin, which arm has on the forward side of its lower end a catch, 27, for a purpose hereinafter more fully set forth. A pin, 135, in the bolt serves to support the abutment-sleeve, 31, for the firing-spring 32. Near its rearward end, and intersecting the bore for the firing-pin, the bolt has formed therein the transverse bore 140 to receive the bolt-actuator.

The swinging member, F, of the bolt-mechanism I generally designate as the "bolt-actuator," since it is through and by means of this member, or element, when the same is locked in its rearward position shown in Fig. 4, that the bolt is advanced and retracted. One of the principal functions, however, of said actuator is the locking of the bolt in its closed position by engaging the receiver, or frame, B, of the gun; and hence said element F is sometimes designated as the "bolt-locker." For this latter purpose (as well as for retracting the firing-pin) the bolt-locker is made shiftable by a pivotal, or swinging, movement from one position to another relatively to the bolt, the forward position being shown in Figs. 1, 2 and 3, while the opposite, or rearward, position is shown in Fig. 4. Said shiftable movement is, by means of the organization and arrangement of the parts described, brought into a plane parallel, substantially, with the bolt-movement, so that the bolt-locker and the bolt itself are both actuated by a single continuous movement of the handle-arm of said locker; this arm being, for that purpose, located at the side of the receiver, and arranged to extend, when the locker is closed, somewhat below the line of the bolt. Another function of the actuator F, besides holding the bolt E in its closed position, is to prevent the full forward movement of the firing-pin until after the bolt has been carried forward and safely locked in place.

Figures 1, 2:
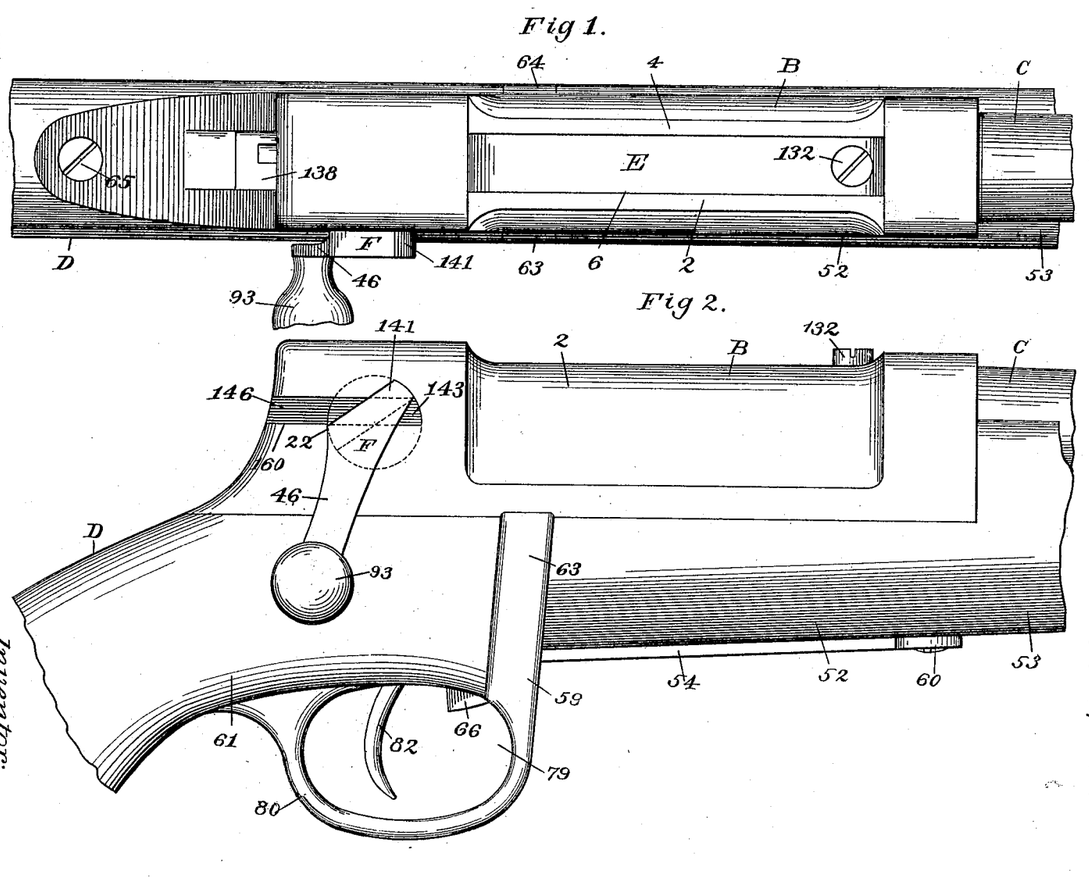
Figure 1 is a plan view of a bolt-gun of that class provided with my present improvements.
Fig. 2 is a right-hand side elevation of the gun.
Figure 3:
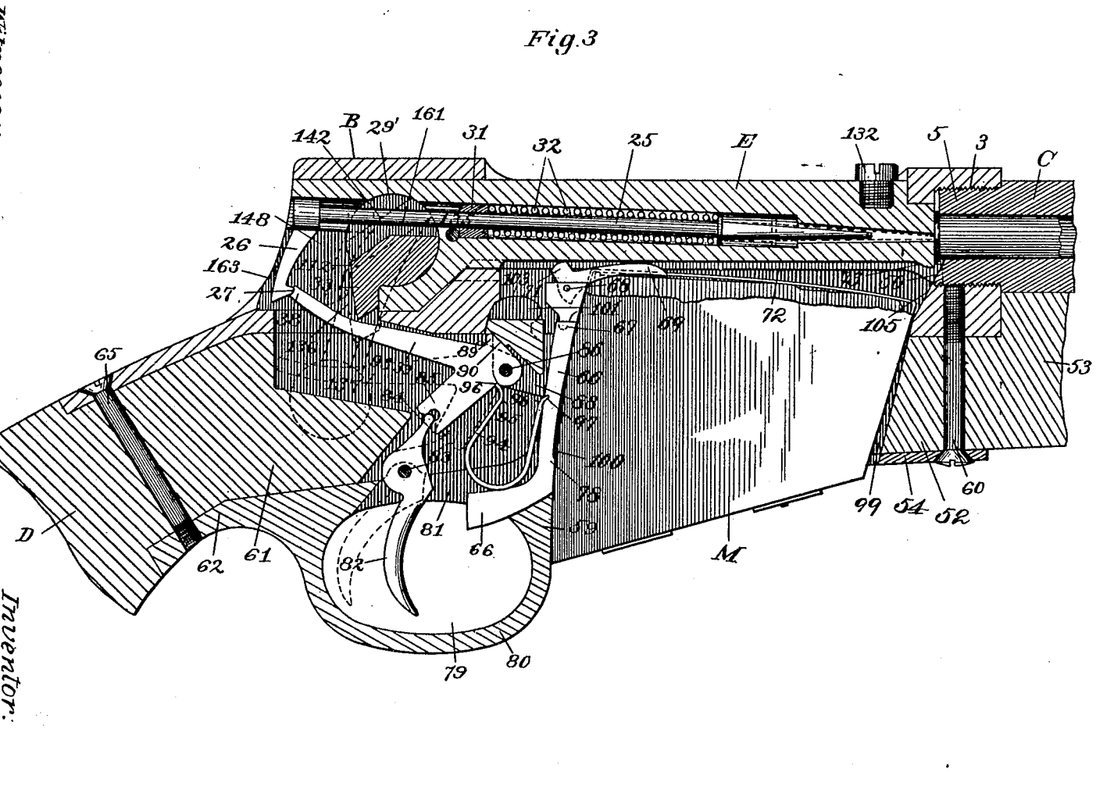
Fig. 3 is a vertical longitudinal section of the mechanism of the gun, showing the parts in the position when the gun is closed ready for firing, and showing also, by dotted lines, the trigger drawn back and the firing-pin thrown forward.
Figures 11, 13, 14:
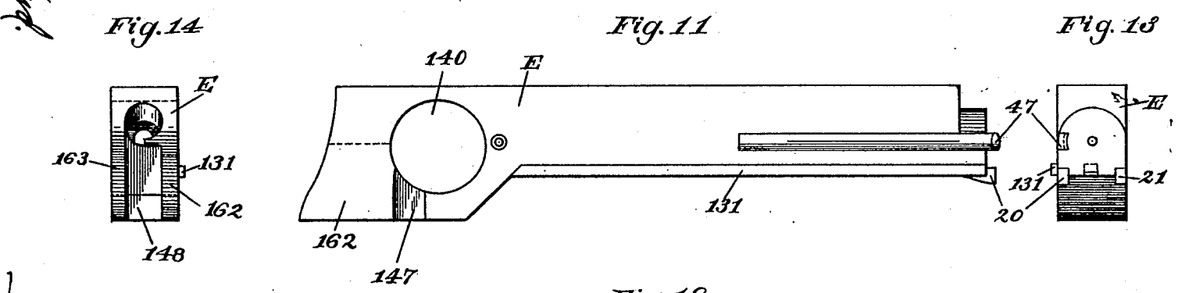
Fig. 11 is a right-hand elevation of the bolt.
Fig. 13 is a view of the front end of the bolt.
Fig. 14 is a view of the rear end of the bolt.
Figure 12:
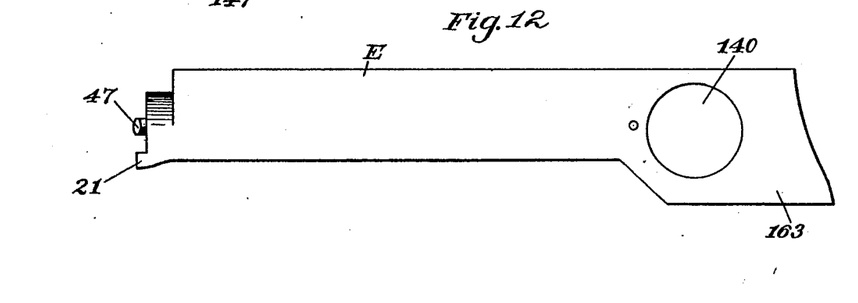
Fig. 12 is a left-hand elevation of the bolt.
Figure 15:
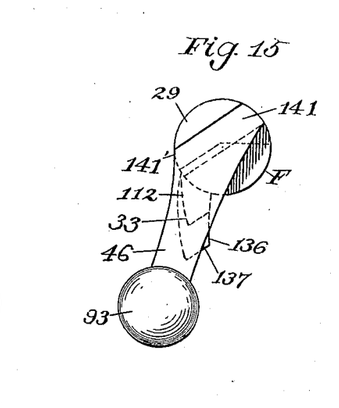
Fig. 15 is a right-hand side view of the bolt-actuator.
Figure 16:
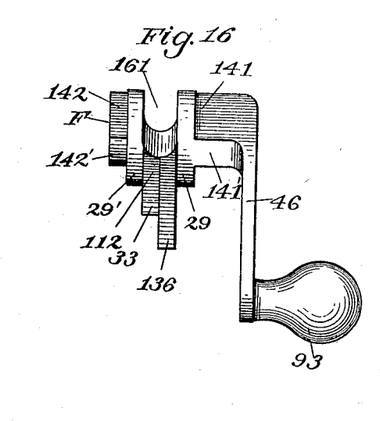
Fig. 16 is a rear elevation of said actuator when in the position shown in Fig. 2.
Figure 17:
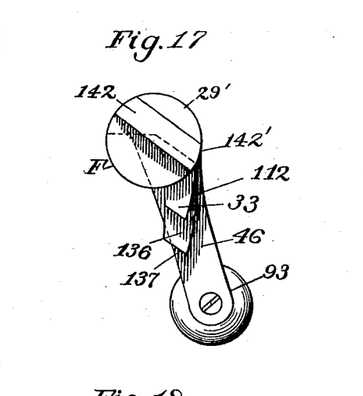
Fig. 17 is a left-hand side elevation of the actuator.
Figure 18:
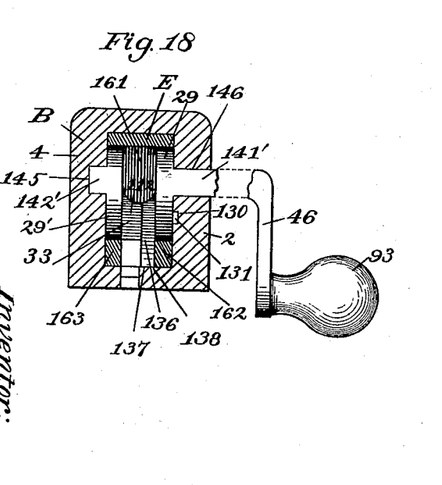
Fig. 18 is a vertical cross-sectional view of the receiver and bolt, in line *a a* of Fig. 4.

The bolt-actuator is journaled in the rearward end of the bolt E, with its axis crosswise of the line of movement of said bolt, and adapted to be turned by means of its handle from the locked position shown in Figs. 2 and 3 to the open, or unlocked, position shown in Fig. 4. The working portion of said bolt-actuator is of the general form of a cylinder, as will be understood by comparison of the figures of drawings, Figs. 15 to 18, inclusive. The end portions of the cylindrical part of the actuator constitute the journals on which the actuator turns within the bore, or bearing, 140, (Figs. 11 and 12,) of the bolt E, said journal surfaces being designated by 29—29', respectively. Intermediate to its said journals, the actuator F is shown provided with an arm, 136, whose end-face, 137, is fitted to bear, during a certain portion of the forward movement of the bolt, upon the surface 138 of the receiver B. Adjacent to said arm 136, the actuator is also provided with a catch, 33, whereby to lock the actuator in its open position, as in Fig. 4, during the greater part of the longitudinal movement of the bolt-mechanism; this feature is hereinafter more fully described.

As a means for locking the bolt E in its closed position shown in Figs. 1, 2 and 3, the actuator F is provided at each end of the cylindrical portion thereof with the projecting abutment-plates 141 and 142, respectively, whose rear edges, 141' and 142', are adapted to engage (when the bolt is in its forward position and the actuator is turned from its position shown—partially by solid and partially by dotted lines—in Fig. 4, down to its position shown in Figs. 1, 2 and 3,) with the corresponding receiver-abutments 22 and 22'. (See Figs. 2, 6, 8 and 9.) Said receiver-abutment faces 22—22' are at the rearward side of the openings 143 and 144, respectively, which are formed in the receiver-walls. The opening, 144, formed in the left-hand wall 4, is made to extend only partially through the thickness of the wall and is shaped to permit of the required rotatory movement of the actuator-abutment plate 142 within said opening. For permitting the withdrawal of said abutment-plate 142 from the receiver on the retraction of the bolt, a groove, or channel, 145, communicates with said space, or opening, 144, as will be understood from Figs. 8 and 18. A corresponding opening, or channel, 146, is cut entirely through the right-hand wall, 2, of the receiver, (see Figs. 2, 9 and 18,) for the passage of the abutment-plate 141, to the outer end of which is connected, as well shown in the drawings, the actuator-arm 46. Similarly, the opening 143 in the said right-hand wall 2 extends entirely through the said right-hand wall; this is for the purpose of permitting the passage through it of the outwardly-projecting right-hand abutment-plate, 141, of said actuator, as will be understood from Figs. 1, 2 and 18.

An inspection of the several figures of the drawings showing the relation of the abutment-plates 141 and 142 to the openings and slots 143—144 and 145—146, respectively, in the receiver B, will show that the upper and lower surfaces of said plates, by sliding in said slots 145 and 146, would operate to prevent the rotation of the actuator F during the latter part of the forward movement of the bolt and until the actuator and plates are carried so far forward as to permit said abutment-plates to be turned into engagement with the abutment-faces 22—22'; but owing to the short radius of the abutment-plates and the comparatively long radius of the handle 93, the pressure upon the sides of said slots by reason of the forward thrust on the handle-arm would cause so much friction as to seriously interfere with the working of the gun. It is for this reason chiefly that the arm 136 is constructed to bear upon the receiver-face 138 during the forward movement of the bolt after the actuator has been unlocked therefrom; and by reason of the comparatively long radius of said guide-arm 136, and also by reason of the position of said arm and its supporting face 138 relatively to the other parts of the bolt-mechanism, any binding or cramping of the parts during the aforesaid period is entirely prevented.

As a means for assembling the bolt E and its actuator, said bolt has formed in one side thereof the channel, or passage way, 147, (Figs. 4 and 11,) through which, when sliding the cylindrical portion of the actuator into the cylindrical opening 140 in the bolt, the arm 136 of said actuator may pass until it comes into alignment with the slot 148, Figs. 3, 4, 14 and 18, in which said arm is adapted to swing. As shown in Fig. 2, the lower line 160 of the receiver-slot 146 is made to coincide nearly with the center, or axis, of the actuator-cylinder; and the abutment-plates 141 and 142 of said actuator are correspondingly located, nearly or quite the whole thickness thereof, above said actuator-axis. By this means the abutting faces 22 and 22', respectively, of the receiver are brought so far upward relatively to the bolt that the force of the recoil transmitted thereto through said actuator does not greatly tend to raise the bolt in the receiver, or gun-frame.

For the purpose of providing space for the firing-pin, a notch, or passage-way, 161, is formed in the upper side of the actuator, through which the stem, 25, of said pin passes, as will be understood by comparison of these features in the several figures of drawings.

The actuator F is prevented, when the bolt is withdrawn as illustrated in Fig. 4, from movement longitudinally of its axis by the side-walls 162 and 163 at the rearward end of the bolt E, between which walls swings the aforesaid arm 136 of the actuator. When the bolt is in its forward position, the end portions of the cylindrical part of the actuator, above and below the abutment-plates thereof, project so far above and below the opening 146 in the right-hand receiver-wall 2 as to securely hold the actuator in its proper position.

To disassemble the actuator and bolt, the bolt-mechanism is withdrawn from the gun, (which may be done by removal of the stop-pin or screw 132,) the firing-pin is removed by first driving out the pin 135, thereby removing also the locking-arm 26 and leaving the actuator free to be swung to bring its arm 136 to the aforesaid opening 147 shown in the right-hand side of the bolt E, in which position (corresponding to that in Fig. 3) the actuator is free to be withdrawn from the bolt by sliding it outward toward the right-hand from the cylindrical opening 140 in the said bolt.

The actuator F is furnished, as above stated, with a depending arm, 33, the rearward side, 112, of which serves, on the retractive movement of the bolt-actuator, to draw back the firing-pin from the position shown in Fig. 3 to that shown in Fig. 4; on the extreme retraction of the actuator, said arm passes over and engages upon the aforesaid actuator-locker-catch 27 of the firing-pin-arm, so as to lock the actuator in its retracted position shown in Fig. 4. Said several parts of the "bolt-mechanism" being thus positioned and locked together, may then be drawn back as one member of the gun-mechanism, as illustrated by dotted lines in Fig. 4, and afterward pushed forward again; during this latter movement the firing-pin-arm 26 engages the rearward end 38 of the sear 39, and is thereby held retracted during the remaining forward movement of the bolt-mechanism to the position thereof shown in Fig. 3. Said forward movement carries the bolt-actuator arm 33 forward of said firing-pin catch 27, and thus releases the actuator, which may now be turned forward to close and lock the bolt.

The actuator safety-arm, 136, is for preventing the turning forward of said actuator (after the unlocking of the actuator-arm 33 from the firing-pin-arm catch 27,) until the bolt has been pushed fully forward. During the latter part of the forward movement of the bolt from its dotted position in Fig. 4 to the position shown in solid lines in said figure, the lower end or face, 137, of said safety-arm 136 slides on the face 138 of the receiver, thus preventing the turning down of the actuator until the bolt has been pushed fully forward; at which time said arm may pass downward into the slot, or opening, 139, formed therefor in the receiver, (see Fig. 9,) thus permitting of the forcible uncatching of the arm 33 from the catch 27.

The projections 20—21, at the forward end and lower part of the bolt, serve to support the cartridge-head from falling during the retraction of the cartridge by the engagement of the retractor-hook 47 with the rim thereof. See Figs. 10 to 13. Said projections, when the bolt is locked in its forward position, enter corresponding recess formed in the rearward end of the barrel. On the barrel, between said recesses, is shown a projection having a concaved face, 50, suitably inclined for receiving the forward end of the cartridge when this is driven forward by the bolt, and thereby guiding said cartridge upward into the rear of the barrel. At the right-hand inner side of the barrel, a suitable notch should be formed to receive the projecting forward end, or hook, 47, of the extractor.

In Figs. 1 and 2, a short portion of the rearward part, 52, of the tip 53 of the gun-stock is shown. On the end of this tip is usually placed the escutcheon-plate 54, which forms a guide for the insertion of the magazine, and whose rearward ends fit into corresponding notches in the forward face of the guard-block 59. Through the forward end of said escutcheon passes a screw, 60, which extends through said tip 53 and screws into the forward end of the receiver, as shown in Figs. 3 and 4. The breech-piece, 61, of the stock is shown fitted to the under side of the receiver and between the receiver and the strap, 62, of the guard-block; the forward end of the breech-piece being fitted within the side-walls, 63 and 64, of said block. A screw, 65, passes through the rearward end of the receiver, through the stock, and screws into the rearward end of said strap 62, as will be understood from comparison of the figures of drawings in which said parts are shown.

The guard-block is shown centrally mortised at the forward end thereof to receive the magazine-catch 66, which is pivoted at 67, and carries at its upper end, by a pivot, 68, the ejector-arm 69; which arm is set into a slot formed in the upper end of said magazine-catch, and has an actuating-arm, 71, which reaches upward into the groove, 72, formed in the under side of the bolt E. Said groove, at its forward end, is shaped at 73 to form a cam, which on the retraction of the bolt strikes said arm 71 of the ejector and throws this downward into the position shown by dotted lines in Fig. 4, thereby ejecting the shell upward through the mortise, 6, of the receiver.

The magazine catch 66 is shown pivotally supported, or journaled, on projections set in corresponding sockets, or pivot-bearings, formed in the upper side of the guard-block, and is thereby securely retained in place when the gun is assembled. The catch-lever 66, designated in a generel way as a magazine-catch aforesaid, has on the forward side thereof a catch, or hook, 78, for engaging with the magazine when this is inserted into its receiving-chamber. The lower end of said catch lever 66 is extended downwardly and rearwardly to project a short distance within the space, 79, within the trigger-guard 80, which guard joins at its front end the front portion of the guard-block, and at its rearward end joins the strap, 62, thereof, the guard being generally and preferably made integral with the other portions of the guard-block. The mortise, 81, of the guard-block is shown extended backward into the strap, 62, thereof to receive the trigger 82, which is pivoted at 83, and whose upper end, 84, connects with the arm 85 of the sear 39, which is pivoted at 86 in ears, as 88, formed on the guard-block. The stop 89 on the sear limits the upward movement of the sear by striking against the face 90 of the guard-block. The rearward end, 38, of the sear is shown shaped to engage the lower end, 27, of the firing-pin-arm 26 when this is moved forward during the closing movement of the bolt. For retracting the sear, the sear-spring 94 is inserted thereunder, having its end 95 working in a notch, 96, formed in the sear-arm 85, as shown. Said spring also is shown having its opposite end seated in a notch, 97, in the rearward side of the magazine-catch, so that the one spring actuates both the sear and the magazine-catch.

The magazine, designated in a general way by M, shown in the drawings is supposed to be the same magazine as shown and described in the aforesaid application, Serial No. 443,481. It will be understood, however, that neither the use of a magazine nor the construction of the same is a feature of my present invention, and that my improvements are equally applicable to single-loading fire-arms.

The general operation of the fire-arm is as follows: The gun having been fired, and the bolt remaining closed, the gunner, seizing the handle, 93, of the bolt-actuator, draws directly backward thereon to retract the bolt-mechanism throughout its full stroke to the position shown by dotted lines in Fig. 4. The first movement of the actuator F is to turn itself from its position in Fig. 3 to its position in Fig. 4. This movement of said actuator carries the actuator-arm 33 backward against the firing-pin-arm 26, and retracts the firing-pin to its position shown in said Fig. 4, engaging the catch 27 of said firing-pin-arm over the end of the actuator-arm, and thereby locking the actuator firmly in its retracted position. This position of the bolt-mechanism having been reached, the further drawing back upon the actuator-handle 93 slides the bolt backward to its retracted position shown by dotted lines in Fig. 4. Just previous to reaching its fully retracted position, the ejector-cam 73 on the under side of the bolt strikes the arm 71 of the ejector and forcibly throws this downward, and the ejector-arm 69 upward, thereby ejecting the shell upward through the mortise, 6, of the receiver, as hereinbefore more fully set forth. The shell having been ejected and another cartridge brought up by the magazine to the position shown in Fig. 3, forward of the bolt, the operator then pushes forward the bolt by a steady pressure upon the actuator-lever 46. The first forward movement of the bolt drives the cartridge forward, with its point against the guide-way 105, which lifts the cartridge-point upward to the gun-chamber, so that during the remaining forward movement of the bolt the cartridge is slid into place in said chamber. The bolt having gone forward the major part of its movement, the lower end of the firing-pin-arm 26 engages the sear and is thereby held retracted during the remaining forward movement of the bolt-mechanism. At the same time the face 137 of the safety-arm 136 slides on the safety-face, or lever-bearing, 138, of the receiver, thereby preventing any rotary shifting movment of the actuator until the bolt has gone fully forward; at this time the arm 136 will have passed off the said face 138 of the receiver, and the actuator may be turned on its journals to lock the bolt, the arm 136 swinging down into the slot, 139, formed in the receiver therefor. This construction and organization of the parts insures the releasing of the actuator-arm from the firing-pin-catch prior to the beginning of the forward rotary movement of the actuator. The gun now being loaded and locked ready for firing, the gunner has only to take aim, and, when ready to fire, pull the trigger; this, through the connections described, retracts the sear from its engagement with the firing-pin, which is then thrown forward by the main-spring 32 to strike with its point 107 the cap of the cartridge and thus fire the same. The gun, having been fired, is then ready for a repetition of the loading operation, which is again performed as hereinbefore described.

By the term "sliding bolt," as used herein, is meant the longitudinally-reciprocating bolt arranged rearwardly of the gun-barrel for opening and closing the same, said bolt being drawn back by a longitudinal movement thereof for opening the barrel and extracting the cartridge, and carried forward by a reverse longitudinal movement thereof to drive the cartridge into the barrel and close the bore thereof.

Having thus described my invention, I claim—

1. In a fire-arm of the class specified, the combination with a receiver adapted for engaging the sliding bolt and having bolt-locking abutments, substantially as described, in the side-walls thereof, of the sliding bolt transversely bored for receiving the bolt-locking actuator and longitudinally bored for receiving the firing-pin, said longitudinal bore intersecting the transverse bore, the actuator F journaled in the bore and constructed for engaging the receiver to lock the bolt in its forward position and having the notch 161 coinciding with said longitudinal bore, the firing-pin adapted for sliding movement in the longitudinal bore of the bolt, and an arm on the actuator constructed and arranged for retracting the firing-pin on the turning of the actuator to unlock the bolt, substantially as set forth.

2. In a fire-arm of the class specified, the combination with a receiver having one or more bolt-locking-abutment openings in the side-walls thereof, of the sliding bolt having the transverse bore 140, the firing-pin bore and the slot 148, an oscillating actuator journaled in said transverse bore and having one or more abutments, substantially as described, for engaging the receiver to lock the bolt in its forward position, means for turning said actuator in the bolt, the firing-pin and its arm provided with a catch, said arm working in the slot 148, and the catch-arm on the actuator, said catch-arm also working in said slot and being adapted for retracting the firing-pin and engaging the catch thereof for locking the actuator in its retracted position, whereby the bolt may be operated by means of the actuator handle-arm, substantially as set forth.

3. In a fire-arm of the class specified, the combination with a suitable receiver, of the sliding bolt having the transverse bore 140, the side-walls 162 and 163 rearward of said bore and having the space 148 between said walls, said bolt having the slot 147 in one of said walls, and the oscillating bolt-locking actuator journaled in said transverse bore and having a catch-arm, substantially as described, adapted to work in said space 148 for actuating a firing-pin, and adapted to be passed through said slot 147 for assembling the parts, substantially as set forth.

4. In a fire-arm of the class specified, the combination with a receiver substantially as described, having the opening 143 extending through the side-wall thereof and the abutment-face 22 at the rearward side of said opening, and having a slot 146 leading from said opening to the rear edge of the receiver, of the sliding-bolt having a transverse bore in alignment with the said receiver-opening when the bolt is in a plane parallel to the width of the receiver and having an abutment constructed to pass through said slot 146 and adapted for oscillating movement in said opening forward of said abutment-face, and a crank-arm capable of vertical oscillation carried by said actuator abutment outside of the receiver, whereby the actuator and bolt may be operated for unlocking, sliding and re-locking the same with relation to the receiver, substantially as set forth.

FRANCIS H. RICHARDS.

Witnesses:
W. G. RICHARDS,
HENRY L. RECKARD.